Patented May 9, 1950

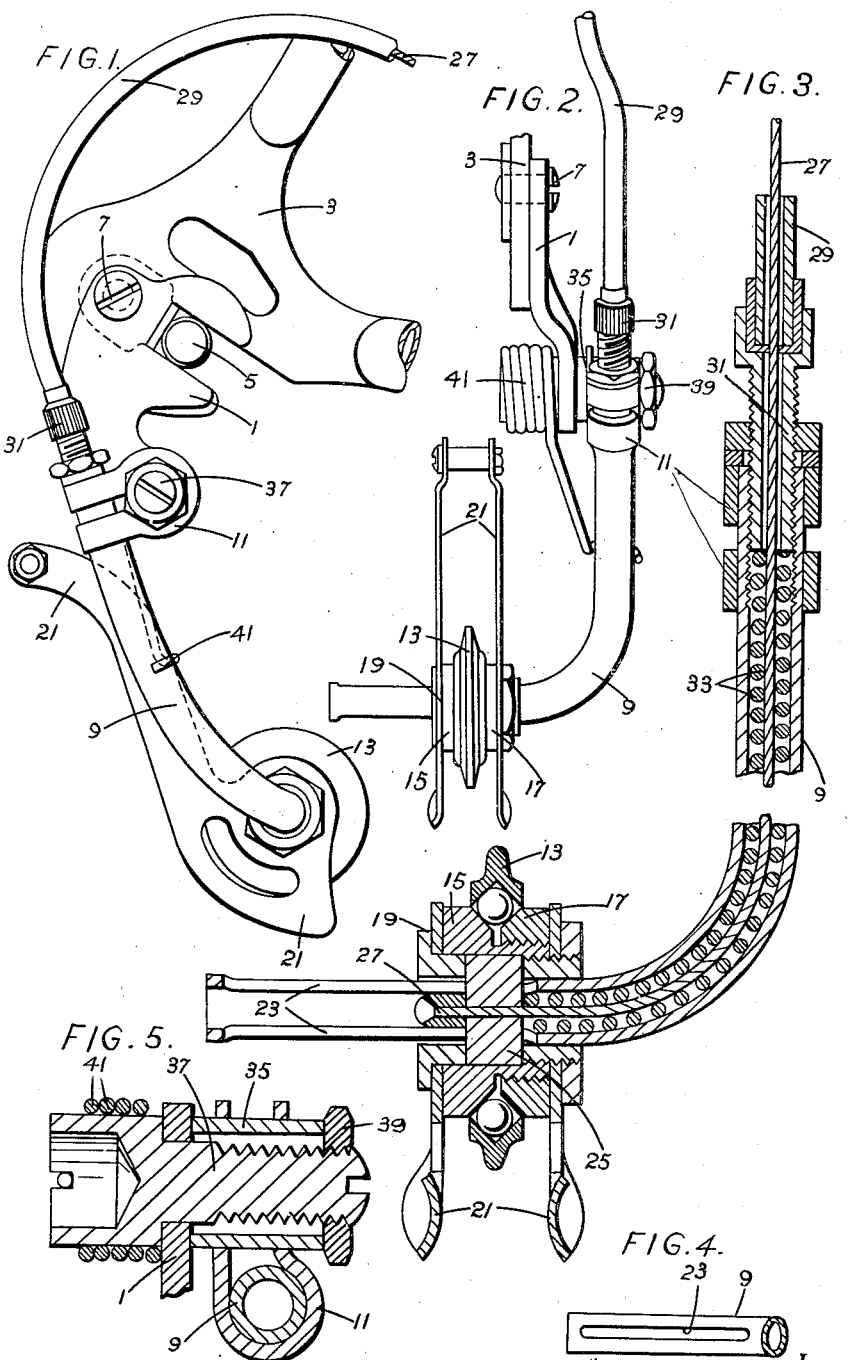

2,507,416

UNITED STATES PATENT OFFICE 2,507,416

CHAIN SHIFTING DEVICE FOR CYCLES

Victor Ernest Needham, Wilford, England, assignor to The Birmingham Small Arms Company Limited, Small Heath, England, a British company Application October 11, 1948, Serial No. 53,950
In Great Britain October 18, 1947

4 Claims. (Cl. 74—217)

This invention relates to chain shifting devices for cycles of the kind in which the chain is shifted or displaced from one to another of sprocket wheels of different size mounted on the rear wheel hub of the cycle for the purpose of obtaining a variable gear, the mechanism usually being contrived as an attachment to the cycle and comprising a jockey sprocket and a chain tensioning sprocket carried by a pivoted arm, the device being operable by means of a cable or Bowden wire transmission mechanism.

In chain shifting devices of the aforesaid kind it has been proposed to mount the jockey sprocket and pivoted tensioning arm on a horizontal tube secured to a bracket which is attached to the cycle frame, the said tube containing a coil spring one end of which is anchored to the tube while the other end exerts a lateral thrust against the jockey sprocket. Thus the tube, the spring and the jockey sprocket together form the chain shifting device, lateral movement to the jockey sprocket and the chain tensioning sprocket being in one direction imparted by the spring and in the opposite direction by a flexible transmission cable, but in such chain shifting structure the tube has to be relatively long to accommodate the spring and provide for the necessary lateral movement of the jockey sprocket, so that outward protrusion of the tube renders it liable to damage.

According to this invention the aforesaid objection is overcome by slidably mounting a jockey sprocket or pulley on a rod or tube which constitutes a combined tension arm pivotally attached to and depending from the cycle frame, said rod or tube being bent to form a portion extending in a direction normal to the remainder thereof and for a distance sufficient only to provide for the necessary axial movement of the jockey sprocket or pulley, a coiled compression spring associated with the rod or tube for imparting in one direction axial movement to the jockey sprocket or pulley, and means for imparting movement thereto in an opposite direction through the medium of a flexible transmission cable.

In the accompanying sheet of explanatory drawings:

Figure 1 is a side elevation of a chain shifting device constructed in accordance with the features of this invention;

Figure 2 is an end elevation of Figure 1;

Figure 3 is a sectional end elevation of the device on an enlarged scale;

Figure 4 is a fragmentary plan view of the slotted end of the gear tube, and

Figure 5 is a sectional view of the tension spring carrier and gear tube adjusting clip.

According to one convenient mode of carrying the invention into effect as shown in the drawings, a bracket or supporting member 1 for the chain shifting device is attached to the rear fork end 3 of the cycle frame by means of a slotted portion engaging with the spindle 5 of the wheel hub and a fixing screw 7. A tube 9 is attached to the bracket 1 by means of an adjusting clip 11 which constitutes part of a tension spring carrier, as hereafter described. A short portion of the tube 9 is bent in a direction normal to the length of the tube, and has slidably mounted thereon a jockey sprocket or carrier pulley 13, said pulley being supported by bearing cones 15 and 17 mounted on a carrier bush 19, which also supports two plates 21 constituting a combined guide for effecting lateral displacement of the cycle chain from one wheel sprocket to another.

The aforesaid portion of the tube 9 has formed therein two diametrically opposed slots 23, as seen in Figures 3 and 4, adapted to receive a pin or peg 25, the ends of which are anchored in slots formed in the carrier bush 19. To the peg 25 is secured through a ferrule one end of the inner wire 27 of a flexible transmission cable, the outer sheath 29 of the cable being retained by an adjuster 31 adapted to be screwed into the end of the tube 9 remote from the slots 23. Within the tube 9 is disposed a coiled compression spring 33 which surrounds the inner wire 27, one end of the spring abutting against the peg 25 while the other end abuts against the cable adjuster 31.

As previously stated the tube 9 is attached to the bracket 1 by means of an adjusting clip 11 which constitutes part of a tensioning spring carrier. Viewed from the end this clip is substantially of U-shape, the closed end encircling the tube 9 and being fixed thereto by welding or other suitable means, while the two limbs each have a co-axial hole formed therein by which the clip is freely mounted on a sleeve 35. Through a hole in the bracket 1 is inserted the threaded stem part of a carrier pin 37 over which is passed the sleeve 35, said sleeve being clamped between the face of the bracket 1 and a nut 39. The head of the pin 37 is enlarged to form a shoulder abutting against the rear face of the bracket 1, and on said head of the pin is mounted the coils of a tensioning spring 41, one end of which is anchored in a slot formed in the head of the pin 37 while the other end of the spring is shaped to contact with the tube 9. In operation the tube 9 swings about the pivot connection between the limbs of the bracket 11 and the sleeve 35 in taking up slack when the chain is being transferred by the pulley 13 from one wheel sprocket to another of different size, the chain tension being maintained by the spring 41.

As shown in Figure 3, the chain shifting device is in the extreme outward position (i. e. in an axial direction away from the hub) in which the high gear is engaged with the chain on the smallest hub sprocket. In this position the inner wire 27 has been fully retracted by the gear actuating lever (not shown) and the spring 33 is compressed. When the normal or low gear is selected, the chain is transferred, during travel, to a sprocket of larger size by axial movement of the shifting device imparted by the spring 33, which effectively transfers the chain when such is being lifted on to a sprocket of larger size.

By arranging the chain shifting device on a length of cylindrical tubing having a portion thereof extending axially of the wheel sprockets for a minimum distance required to permit the necessary movement being imparted to the jockey sprocket or pulley, outward protrusion of the device and consequently the possibility of damage is substantially reduced.

It will be appreciated that the coiled compression spring 33 may be disposed externally of the chain shifting and tensioning arm, in which case the ends of the spring could be arranged to contact respectively with the carrier bush 19 and a suitable abutment in the form of a collar secured to the arm and located between the bush 19 and the point of contact with the arm of the spring 41.

Having thus described my invention, what I claim as new and desire to secure by Letters Patent is:

1. A combined chain shifting and tensioning device for cycles, comprising a rigid arm having means for pivotally attaching it to a cycle frame to depend therefrom, said arm having a short portion integral therewith and extending in a direction normal to the remainder thereof, a jockey wheel mounted on said short portion of the arm for rotation and axial movement thereon, a coil spring extending longitudinally of the arm concentrically to its longitudinal axis and acting on the jockey wheel to impart axial movement thereto in one direction, means including a flexible transmission cable extending longitudinally of said arm concentrically to its longitudinal axis and connected to the jockey wheel for imparting axial movement thereto in the opposite direction, and means acting on the arm to swing the jockey wheel in chain-tensioning direction.

2. A combined chain shifting and tensioning device for cycles, comprising a rigid tube having means for pivotally attaching it to a cycle frame to depend therefrom, said tube having a short portion integral therewith and extending in a direction normal to the remainder thereof, a jockey wheel mounted on the short portion of the tube for rotation and axial movement thereon, a coil spring extending longitudinally of the tube concentrically to its axis and acting on the jockey wheel to impart axial movement thereto in one direction, means including a flexible transmission cable extending axially within the tube for imparting axial movement to the jockey wheel in the opposite direction, and means acting on the tube to swing it and the jockey wheel in chain-tensioning direction.

3. A combined chain shifting and tensioning device as defined in claim 2, wherein said coil spring is a compression spring and is enclosed by and extends axially within said tube.

4. A combined chain shifting and tensioning device for cycles, comprising a rigid arm having a short integral portion depending therefrom and extending in a direction normal to the remainder thereof, a jockey wheel mounted on said short depending portion of the arm for rotation and axial movement thereon, and means for pivotally attaching said arm to a cycle frame for chain-tensioning movement of the jockey wheel comprising a bracket having means for securing it to a cycle frame and having an aperture therein, a carrier pin extending through said aperture in the bracket and having a head abutting against one side of the bracket and a threaded part at the other side of the bracket, a sleeve surrounding the threaded part of said pin, a clip fixed to said arm and mounted on the sleeve to rotate freely thereon, a tension spring supported by said pin, the latter having a slot in its head for anchoring one end of the spring, the other end of the spring engaging said arm and acting thereon to swing the arm in chain-tensioning direction, and a nut on the threaded part of said pin and engaging the sleeve for securing the pin and sleeve against the respective sides of the bracket and thereby prevent rotation of the pin and sleeve relatively to the cycle frame.

VICTOR ERNEST NEEDHAM.

REFERENCES CITED

The following references are of record in the file of this patent:

UNITED STATES PATENTS

| Number | Name | Date |
| --- | --- | --- |
| 2,010,248 | Winkler | Aug. 6, 1935 |
| 2,187,368 | Todrys | Jan. 16, 1940 |
| 2,428,166 | Letourneur | Sept. 30, 1947 |

FOREIGN PATENTS

| Number | Country | Date |
| --- | --- | --- |
| 444,999 | Great Britain | Apr. 1, 1936 |